United States Patent [19]

DaSambiagio

[11] Patent Number: 4,541,406

[45] Date of Patent: Sep. 17, 1985

[54] PORTABLE GRILL

[76] Inventor: Alberto O. DaSambiagio, 1940 SW. 83 Ct., Miami, Fla. 33155

[21] Appl. No.: 613,443

[22] Filed: May 24, 1984

[51] Int. Cl.$^4$ .......................... F24C 1/16; A47J 37/04
[52] U.S. Cl. ............................... 126/9 R; 126/25 A; 99/446; 99/421 HV
[58] Field of Search ............ 126/9 R, 9 A, 25 R, 126/25 A, 9 B; 99/340, 447, 446, 421 HV

[56] References Cited

U.S. PATENT DOCUMENTS

| | | | |
|---|---|---|---|
| 2,968,301 | 1/1961 | Cowart | 126/25 A |
| 3,101,080 | 8/1963 | Lorbacher | 126/25 A |
| 4,334,516 | 6/1982 | Dittmer et al. | 126/9 R |
| 4,462,306 | 7/1984 | Eisendrath | 126/25 A |

*Primary Examiner*—James C. Yeung
*Attorney, Agent, or Firm*—John Cyril Malloy

[57] ABSTRACT

A portable grill comprising a base frame constructed from angle iron or other suitable material having two pair of folding legs running from the front to the back on opposite sides of the base, having two grill support frames each with a sliding guide extending upward at the longitudinal center axis of a base frame, a removable coal tray resting inside the base, a grill rack substantially equal to but less than the width and length of the tray, where the grill rack has a plurality of V-shaped laterally running top bars pitched at an angle to allow grease to drain into a grease catcher located at the lower end of the grill rack, and a means for raising and lowering the grill rack.

10 Claims, 17 Drawing Figures

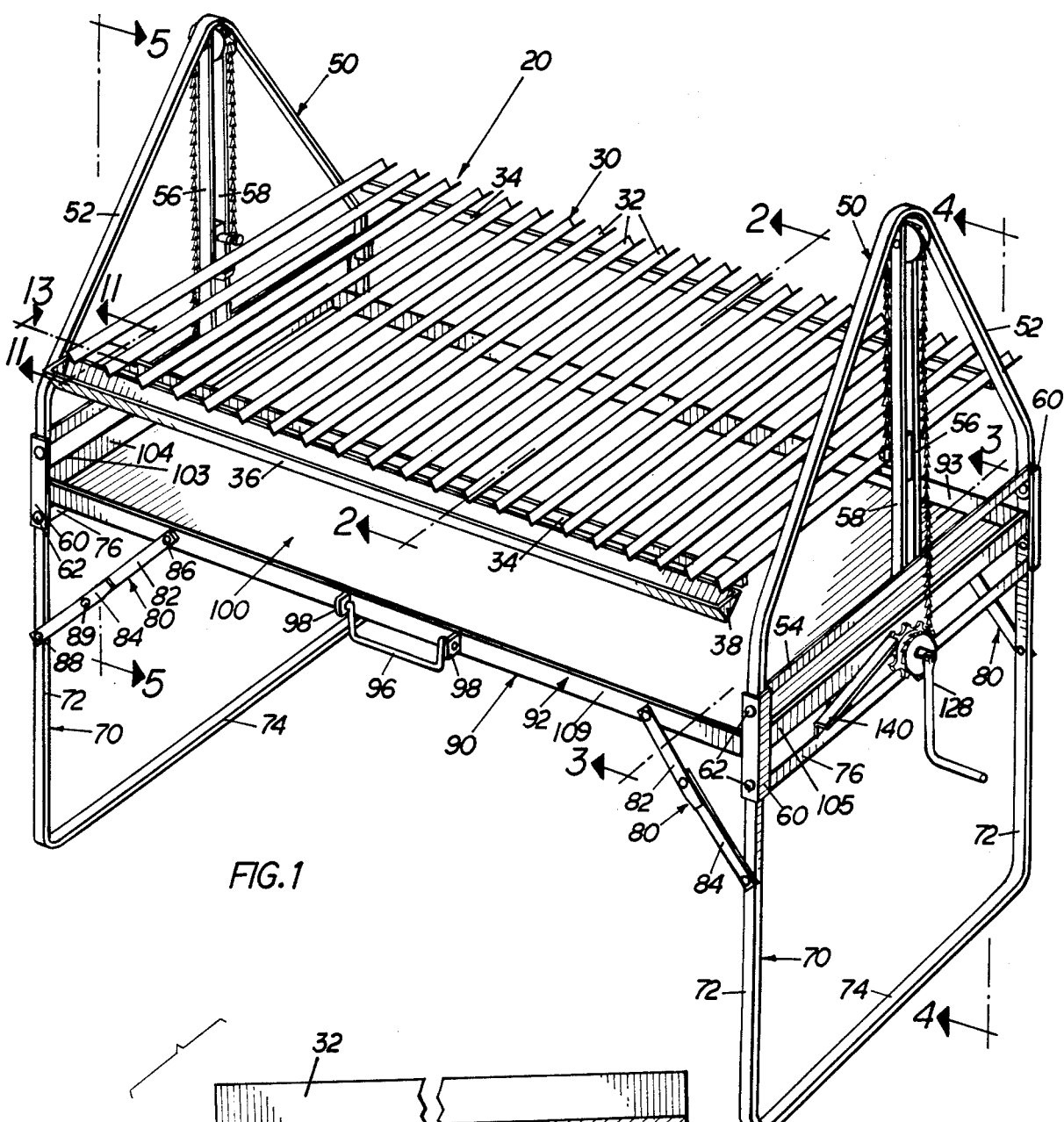
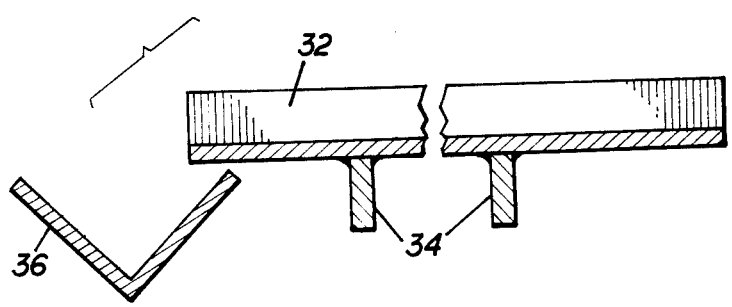
FIG.2
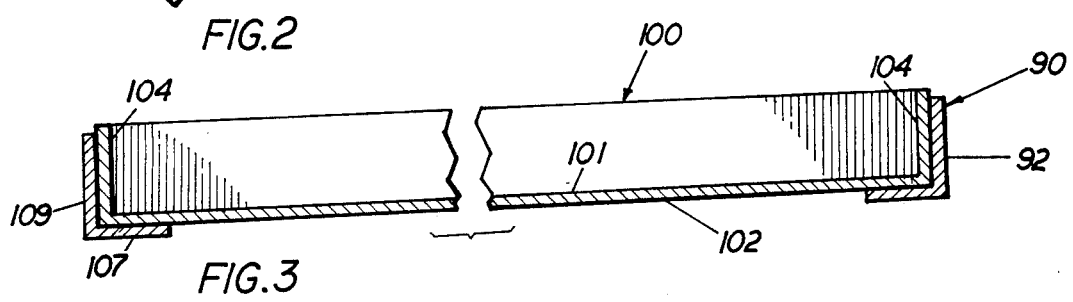
FIG.3

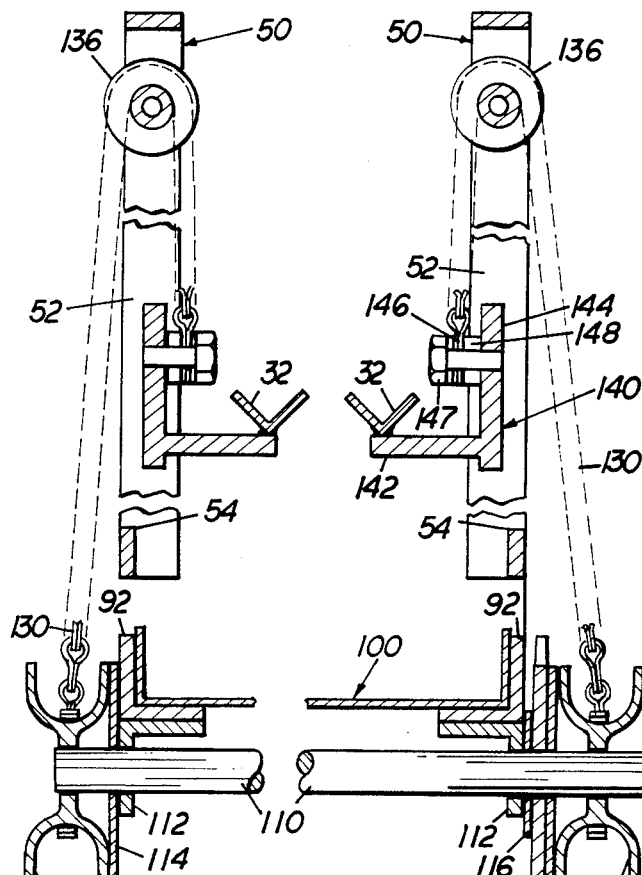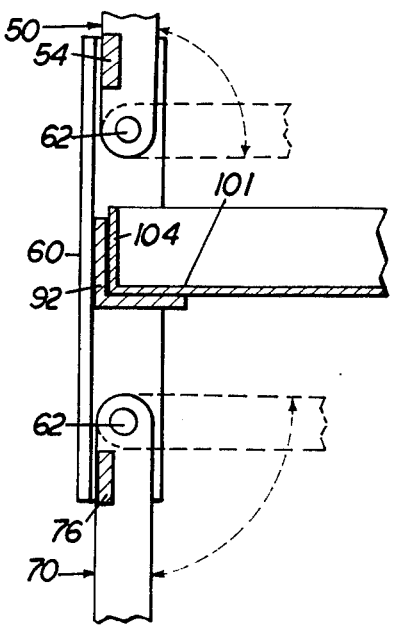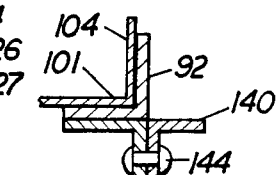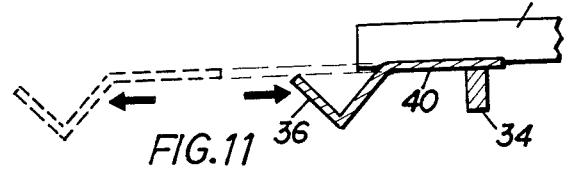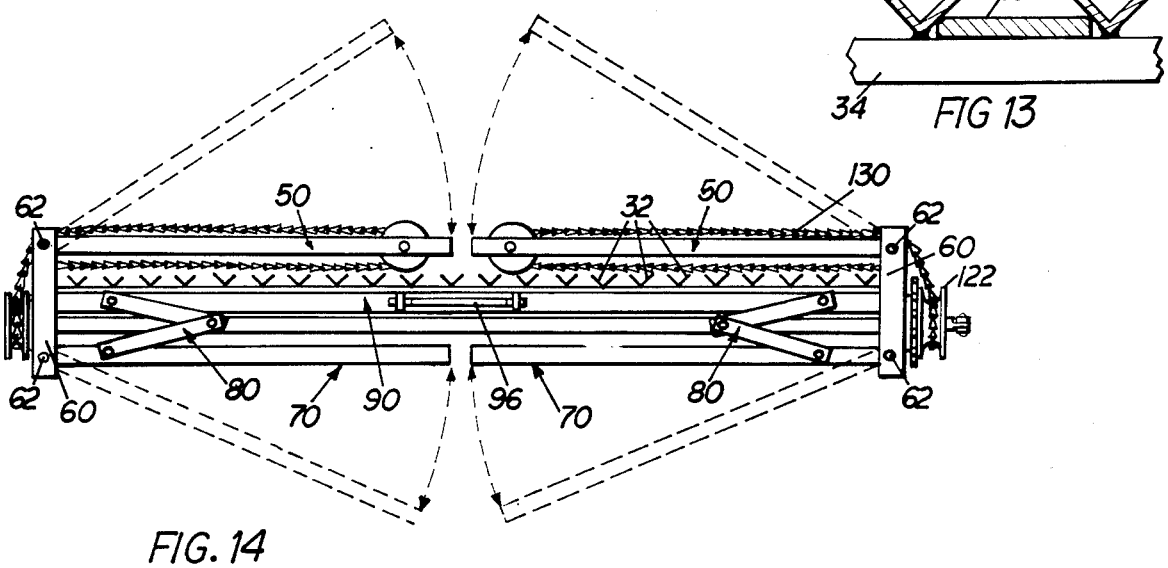

PORTABLE GRILL

FIELD OF THE INVENTION

The present invention pertains to portable grill devices and more particularly to a portable grill with a base constructed of angle iron or other suitable material, a removable coal tray which rests inside the base, two pairs of folding legs, two folding grill support frames, a grill rack, and a means for raising and lowering said grill rack.

BACKGROUND OF THE INVENTION

Conventional grills pose many problems including the problem of storage and the problem of transportation when a grill is required for a cookout at a camp site, park, etc. Although there are grills currently available that are small and compact, they have a relatively small capacity. The grills currently available with a large capacity are cumbersome, bulky and heavy to transport.

The present invention solves all these problems by being very lightweight, approximately 30 pounds, easily erected or unfolded and folded back into its portable state, and easy to store and transport. The present invention can be erected in approximately one minute or less and folded back up into its portable state in approximately the same amount of time. The grill is provided with a handle and is easily carried like a suitcase or briefcase. The grill is flat, rectangular and compact and can be easily stored or transported. The grill has a large capacity being able to cook for 15 persons at one time, and thus being suitable for a large family cookout or other cookouts where large groups are involved. While the grill has a large capacity, it occupies little space and is relatively compact.

Conventional grill racks used on grills currently available, consist of a plurality of equispaced rounded bars. These types of grill racks allow all of the grease that is produced while cooking to drip into the coals which in turn causes the grease to splatter on the rest of the grill structure and also creates flames which heat the food unevenly or scorch the food surface. To minimize this problem, the present invention provides a grill rack with a plurality of V-shaped elongated bars that collect 60% of the grease. The grill rack is tilted so that the grease runs toward one end where a grease catcher defined by a V-shaped bar running longitudinally under the end of the plurality of V-shaped bars, collects the grease. The collection of the majority of the grease minimizes the amount that may be splattered on the grill structure, minimizing clean-up time, and reduces the amount and intensity of flames that may be created by grease dripping into the coals.

Additionally, the present invention provides a removable coal tray to simplify the disposal of the spent coals after they have cooled and to allow a person to clean the area soiled by the coals by simply cleaning the tray.

OBJECTS OF THE INVENTION

One of the principal objects of the present invention is to provide a portable grill structure which can be quickly and easily unfolded for use and, quickly and easily folded back into its portable state.

A further principal object of the invention is to provide a grill structure which is lightweight and compact an easily transported and stored.

Another important object of this invention is to provide a portable grill structure which has a large capacity, i.e., can at one time cook for up to 15 people.

A further object of this invention is to provide a grease catching means to reduce the amount of grease produced while cooking which drips into the coals to reduce the amount and intensity of flames created from the grease dripping into the coals and to minimize the amount of grease that splatters onto the grill structure minimizing clean-up time.

Another object of this invention is to provide a portable grill structure with a means for raising and lowering the grill rack in relation to the coals.

Another further object of this invention is to provide a removable coal tray which simplifies the task of disposing of spent coals and cleaning that portion of the grill soiled by the coals.

In accordance with these and other objects which will become apparent hereinfter, the instant invention will now be described with reference to the accompanying drawings.

DESCRIPTION OF THE DRAWINGS

For a fuller understanding of the nature of the present invention, reference should be had to the following detailed description taken in connection with the accompanying drawings, in which:

FIG. 1 is a perspective view of the invention in its unfolded erected state.

FIG. 2 is a cross-section view taken at the section lines indicated in FIG. 1.

FIG. 3 is a cross-section view taken at the section lines indicated in FIG. 1.

FIG. 7 and FIG. 8 together are an assembly view, with partial cutaways of pertinent sections of the means for raising and lowering the grill rack.

FIG. 9 is a cross-section view taken at the section lines indicated in FIG. 5.

FIG. 10 is a cross-section view taken at the section lines indicated in FIG. 4.

FIG. 11 is a cross-section view taken along the section lines indicated in FIG. 1 showing the attachment of the grease catcher onto the grill rack.

FIG. 12 is a cross-section view taken along the section lines indicated in FIG. 6 showing the storage of the grill rack beneath the coal tray.

FIG. 13 is a cross-section view taken along the section lines indicated in FIG. 1.

FIG. 14 is a front elevation view showing the invention in its folded state.

DESCRIPTION OF THE PREFERRED EMBODIMENTS

Figures 4, 5:
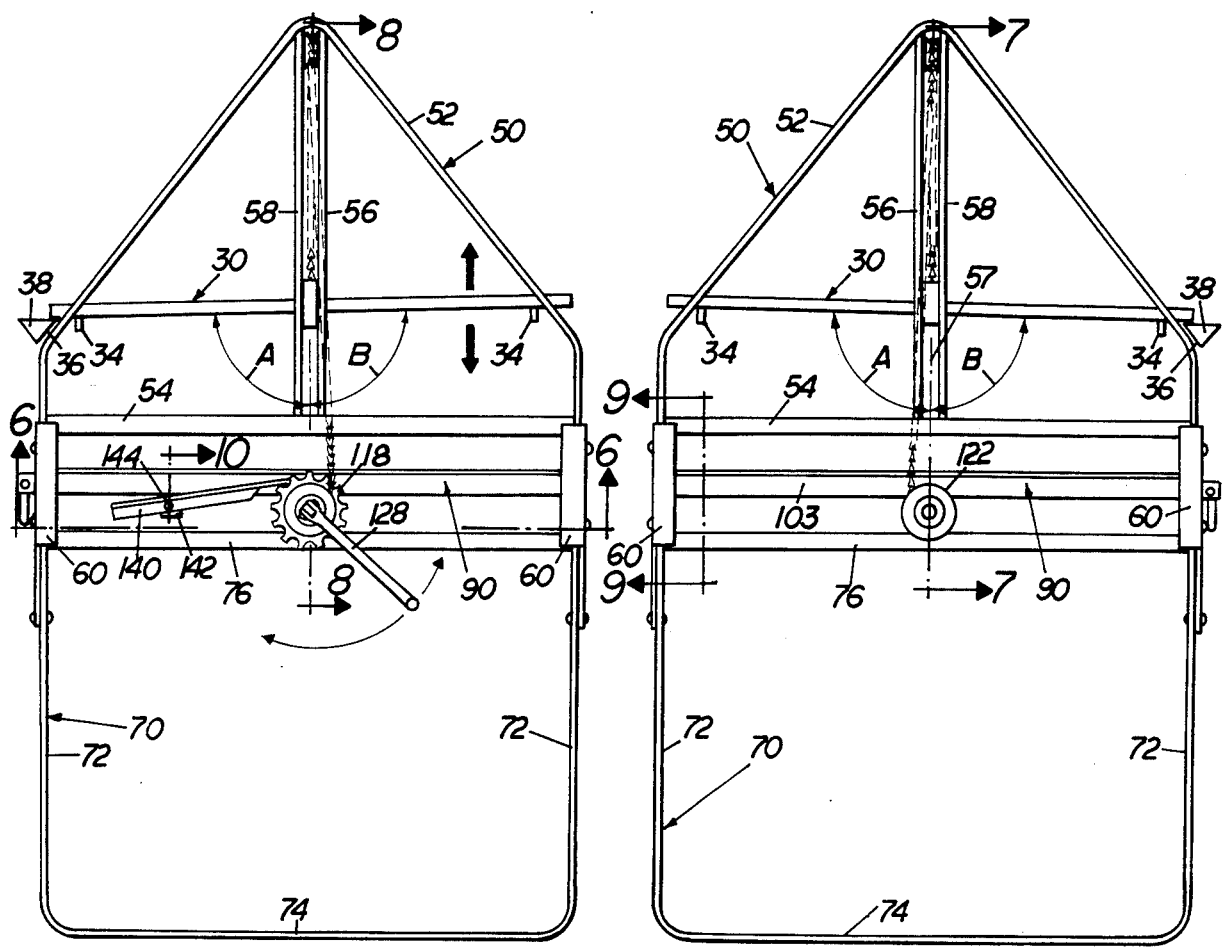
FIG. 4 is a side elevation view of the invention taken at the section lines indicated in FIG. 1.
FIG. 5 is a side elevation view of the invention taken at the section lines indicated in FIG. 1.

With reference to the drawings in which like reference characters designate like or corresponding parts throughout the various views and with particular reference to FIG. 1, the portable grill of the present invention designated generally at 20 includes a base frame 90, two pairs of legs 70, two grill support frames 50, a coal tray 100 which rests inside the frame, a grill rack 30, and a means for raising and lowering the grill rack. The material of which the grill is constructed is referred to as iron throughout the description of the preferred embodiment. Although this material is preferred, the material from which the grill is constructed is not limited to iron but includes any other suitable material.

Figure 6:
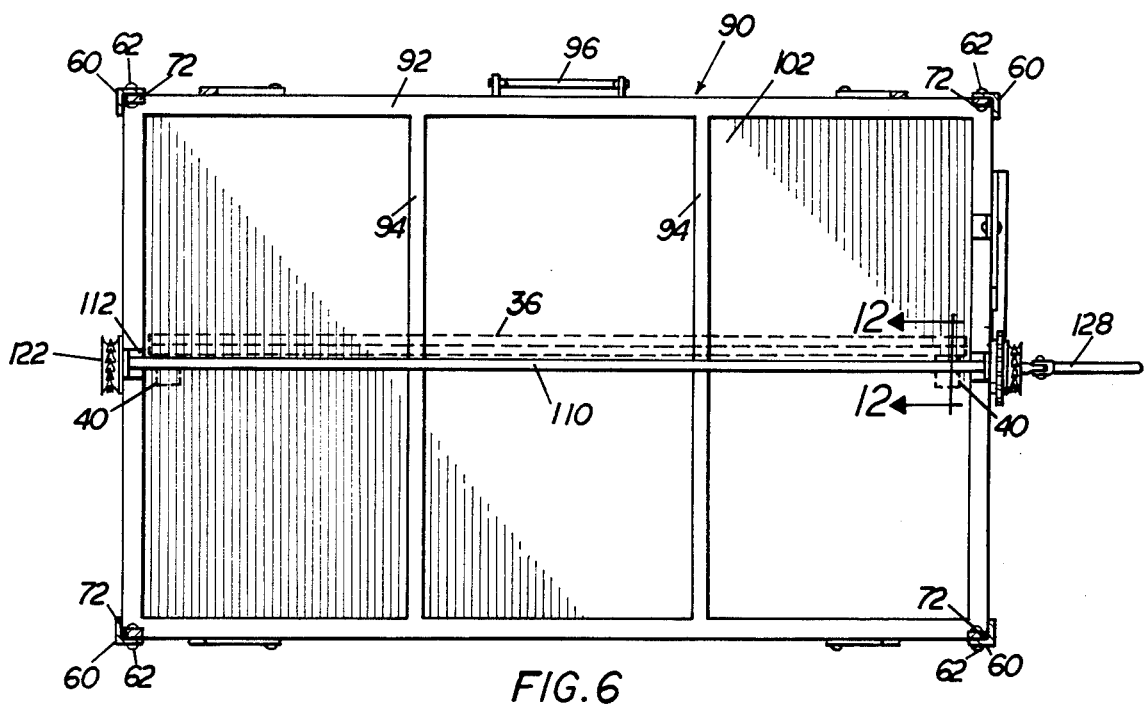
FIG. 6 is a bottom plan view of the present invention.

As best illustrated in FIG. 1 and FIG. 6, the base frame 90 of the grill rack 30 is constructed of angle iron and comprising a front 92, back 93, a first side 104, and a second side 105. The base frame 90 is rectangular in shape and is of a predetermined size substantially equal to but greater than the length and width of the coal tray 100 that rests inside the base frame 90. The coal tray 100 defines four side walls 104 and a bottom 102 and has a length and width substantially equal to but less than the length and width of the base frame 90. As best shown in FIG. 3, the angle irons comprising the front 92, the back 93, and the sides 103 and 105 of the base frame 90 are assembled in such a manner that one leg of each piece of angle iron creates a horizontal ledge-like leg 107 on which the base 102 of the coal tray 100 can rest. The vertical legs of the angle iron of the front 92, back 93 and sides 103 and 105 define a substantially surrounding peripheral wall 109 shouldering the sides 104 of the coal tray 100. For additional support of the coal tray 100, as best shown in FIG. 6, there are two cross bars 94 running laterally from the front to the back of the base 90 and attached at front 92 and back 93 to the ledge-like legs 107 thereof. A handle 96 for carrying the grill structure is fixed to the outer surface of the wall 109 of the side 92 at a position equispaced from the sides 103 and 105 of the base frame 90. The handle 96 is attached to the wall 109 by a hinge means provided by two tabs 98 extending perpendicularly from the wall 109. At each corner of the base frame 90 there is a stanchion-like member comprising a short section of vertically running angle iron 60 extending above and below the base frame 90 and which is fixed by welding to the angle iron which forms the base frame 90. Collectively these stanchions 60 define a support means fixedly attached to the base frame 90 and movably or pivotally support thereon, both pairs of leg means 70 and both grill support frames 50. As best shown in FIG. 1 and FIG. 9, the short sections of angle iron or stanchion 60 extend below the base frame 90 for attachment of two pairs of leg means 70 and above the base frame 90 for attachment of two grill support frames 50. Also, each of the stanchions are of sufficient length to permit pivotal orientation of grill support frames 50 and leg pairs 70 within the boundaries of the stanchion as shown in FIG. 14. Each pair of leg means 70 consists of two vertically running leg portions 72 which curve 90° at the bottom to form a horizontally running leg portion 74. The horizontally running portion 74 rests and provides a foundation for the grill 20 on the surface on which the grill 20 is placed. At the top of the two vertical running leg portions 72 of the leg means 70 there is a brace bar 76 which runs parallel to the horizontally running leg portions 74 and which is attached by welding at either end to each vertical running leg portion 72. The vertical runing leg portions 72 are attached to the short sections of angle iron 60 by means of rivets 62. A leg locking and support means 80 is provided for each vertical leg member extending diagonally from the base to the vertical leg member. The leg locking and support means 80 comprises a first bar 82 and a second bar 84. The first bar 82 is hinged to the frame by a rivet 86 and the second bar 84 is hinged to the vertical running leg portion 72 by means of a rivet 88. The two bars 82 and 84 overlap one another at 84 and are hinged together by a rivet 89.

As illustrated in FIG. 1, a grill support frame 50 is attached to the upper end of the short section of angle iron 60 at the sides 103, and 105 of the base frame 90. The grill support frame 50 is attached to the short section of vertically running angle iron 60 by a rivet 62 as best illustrated in FIG. 9. Just above the point where the grill support frame 50 attaches to the short section of vertically running angle iron 60, a grill support frame brace bar 54 runs horizontally and parallel to the side 105 of the base frame 90. As best shown in FIG. 1, a grill rack 30 hangs from and between the grill support frames 50 and above the coal tray 100. The grill rack 30 comprises a plurality of V-shaped top grill bars 32 spaced along the length of a grill support bars. The grill support bars comprise a pair of bars 34 running longitudinally and parallel along the length of the top grill bars 32 and are spaced at a distance substantially equal to but less than the distance defined by the length of the top grill bars 32. The grill rack 30 is tilted preferably at an angle of 5 degrees from a horizontal plane to allow the grease to drain down the V-shaped corridor provided by the top grill bars 32. A grease catcher 36 is located at the lower end of the grill rack 30 to collect grease and other liquids which collect in the V-shaped top grill bars 32 while cooking and drain from the lower end of the V-shaped top grill bars 32. As shown in FIGS. 1 and 11, the grease catcher 36 defines a means for attachment to the grill rack 30 comprising two metal tabs 40 which fit snugly between the V-shaped top grill bars 32 to secure the grease catcher 36 firmly to the grill rack 30. Each grill support frame 50 defines a guide means which comprises two parallel vertically running bars 56 and 58 which extend from the central longitudinal axis of the base 90 to the apex of the grill support frame 50. The bars 56 and 58 define a corridor 57. As best shown in FIGS. 7 and 8, the guide means also includes a guide 140 which comprises a horizontal leg 142 permanently fixed to the grill rack 30 and a vertical leg 144 which loosely fits between the bars 56 and 58 and runs up and down the corridor 57. As best shown by FIGS. 7 and 8, a means is provided for raising and lowering the grill rack 30 comprises of a chain 130 connected to the grill rack 30 at the guide 140, said chain 130 being draped over a pulley 136 at the apex of the grill support frame 50 and attached to a pulley 122 located at the center longitudinal axis of the frame 90 with each pulley being fixed to a shaft 110 which runs under the base 90. The shaft 110 is connected to a hand crank 128 by a hinge means 127. As best shown in FIG. 8, the chain 130 is attached to the guide 140 by a bolt 147 which passes through a chain attachment member 146 and through a spacer 148 for threaded engagement with the vertical leg 144. To raise or lower the grill rack, the hand crank 128 is turned clockwise or counterclockwise respectively which in turn wraps the chain around the pulley 122. To hold the grill rack in a fixed location, a stop means is provided comprising a gear 118 located between the pulley 122 and the base 112, a washer 116 to space the gear 118 from the base 112, a washer 120 to space the pulley 122 from the gear 118, and a crank stop 141 attached to the base frame 90. Stop 141 is brought into contact with the teeth of the gear 118 to prevent rotation of the shaft 110 and in turn prevent the chain from moving, thus holding the grill rack in a fixed position as illustrated in FIGS. 4 and 6.

As shown in FIG. 6 and FIG. 12, the grease catcher 36 is stored below the base frame 90 by inserting the tabs 40 of the grease catcher 36 under the shaft 110 which holds the grease catcher 36 snugly for storage or transport.

Figure 15:
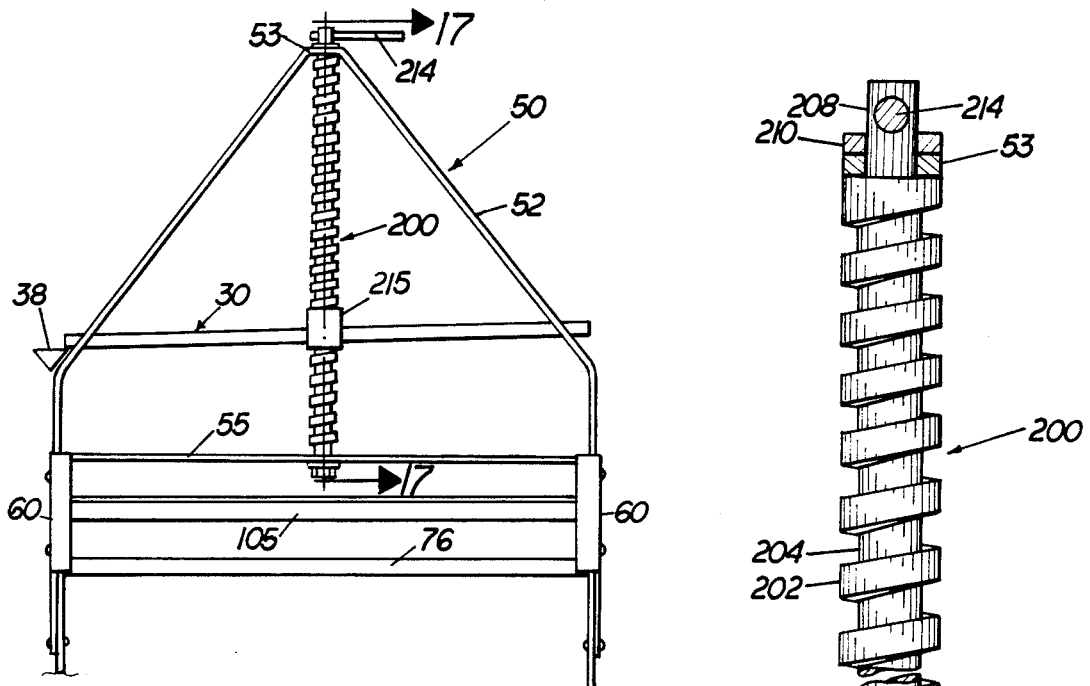
FIG. 15 is a side elevation view showing an alternative embodiment of the means for raising and lowering the grill rack taken along the section lines indicated in FIG. 16.
Figure 17:
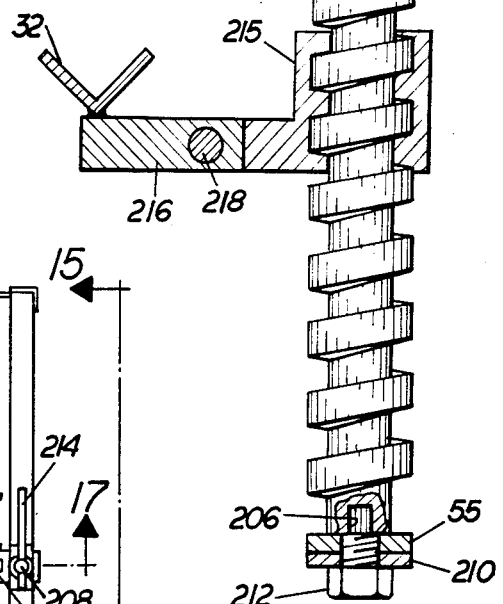
FIG. 17 is a cross section view taken at the section lines indicated in FIG. 15.
Figure 16:
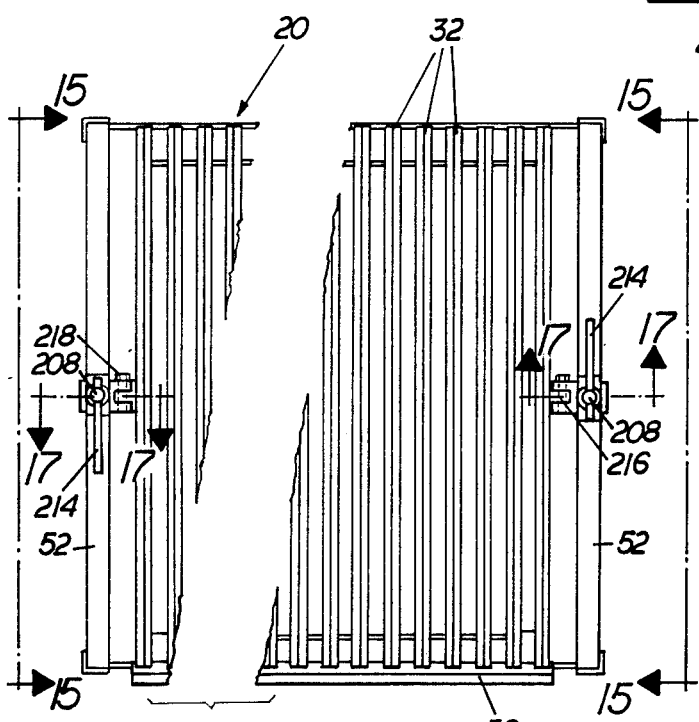
FIG. 16 is top view of the invention showing the alternative embodiment of the means for raising and lowering the grill rack.

FIGS. 15, 16 and 17 illustrate an alternative embodiment of the means for raising and lowering the grill rack 30. As shown in FIGS. 15 and 16, the alternative means is located at either end of the grill rack 30 and consists of a turn screw 200 which runs from the apex 53 of the grill support frame 50 to the laterally running grill support frame brace bar 55. As best shown in FIGS. 15 and 17, the turn screw 200 is inserted through a through hole at the apex of the grill support frame 50 and rides on a pin 206 which is part of the upper end of bolt 212 which passes through a washer 210 and is threadedly engaged to the grill support frame brace bar 55. The grill rack 30 is attached to the turn screw 200 by means of an alternative guide means 215 which is in threaded engagement with the turn screw 200. As best shown in FIG. 17, the grill rack 30 is attached to the alternative guide means 215 by means of a bolt 218 which passes through holes in a mating means between the alternative guide means 215 and the grill rack 30. The turn screw 200 is manually operated at either end of the grill rack 30 by means of a handle rod 214 which passes through a through hole in the portion protruding through the apex 53 of the support frame 208 and extends perpendicularly from the turn screw 200. Since each side can be raised individually, to raise the grill rack surface evenly, each handle rod 214 should be turned an equal number of revolutions and at an equal turning speed.

What is claimed is:

1. A portable grill of the type primarily designed for selective positioning between a collapsed, stored position and an open, operative position, said portable grill comprising:
    (a) a base frame including a front and a back disposed in spaced relation to one another and oppositely disposed spaced apart sides, said front, back and sides collectively defining a substantially closed peripheral configuration,
    (b) support means comprising a plurality of stanchions spaced from one another and each fixedly secured to said base frame at a junction between said front and each of said sides and said back and each of said sides,
    (c) said plurality of stanchions disposed in substantially parallel relation to one another and in transverse relation to said base frame, the latter being secured to each stanchion at a location substantially intermediate the ends of each stanchion, each stanchion extending outwardly in opposite directions from a top and a bottom of said base frame a predetermined distance,
    (d) two pair of legs foldably interconnected to said base frame and selectively positionable between an extended supporting position and a collapsed stored position,
    (e) two grill support frames foldably interconnected to said support means and selectively positionable between a collapsed stored position and an upstanding, operative position,
    (f) a coal tray removably mounted in supported relation on said base frame and being dimensioned and configured for positioning within said closed peripheral configuration,
    (g) a grill rack having a dimension substantially equal to but less than said coal tray and configured for stored disposition therein,
    (h) positioning means for raising and lowering said grill rack,
    (i) said leg pairs being pivotally connected adjacent one end of cooperatively positioned ones of said stanchions extending outwardly from the bottom of said base frame and said two grill support frames pivotally connected to adjacent opposite ends of said cooperatively positioned stanchions, and
    (j) said leg pairs and said two grills support frames being pivotal relative to said stanchions into a folded, substantially parallel orientation relative to said base frame, said predetermined distance of extension of said stanchions being sufficient to dispose said leg pairs and grill support frames within the boundaries of said stanchions defined by the longitudinal dimension thereof.

2. A portable grill as in claim 1 wherein said open, operative position of said leg pairs and said grill support frames is defined by substantially aligned and coplanar relation between a leg pair and a grill support frame and said cooperatively positioned stanchions associated with each of said opposite sides of said base frame.

3. A portable grill as in claim 1 wherein each of said grill frame supports extend from said stanchions in an angularly converging relation to an apex, said apex disposed in substantially aligned relation with a longitudinal axis of said base frame, said positioning means supported in part on each of said grill support frames adjacent the apex thereof and extending in moving connection to said grill rack from a substantially anchored attachment with said base frame.

4. A portable grill as in claim 3 wherein said positioning means comprises a crank shaft rotatably mounted beneath said base frame and out of overhaning relation to said grill rack, a first pulley assembly fixedly attached at opposite ends of said crank shaft so as to rotate therewith, a second pulley assembly rotatably mounted adjacent said apex of each grill support frame and two chains, each connected in driven relation to said first pulley assembly at opposite ends of said crank shaft and each movably mounted to travel relative to said second pulley assembly on one of said grill support frames, each chain including a free end attached to an opposite longitudinal end of said grill rack to cause raising and lowering thereof upon rotation of said crank shaft.

5. A portable grill as in claim 4 wherein said positioning means further comprises a pair of parallel, spaced apart guide rails fixedly secured to each of said grill support frame and extending from said respective apex thereof to a position adjacent a longitudinal end of said base frame, a guide channel defined between said guide rails and along the length thereof, said second pulley assembly including separate pulleys each rotatably connected between said guide rails at the apex of said respective grill support frame and in communication with the respective channel between said respective guide rails, a guide member secured to said grill rack at opposite longitudinal ends thereof and disposed for sliding movement within said channel along the length thereof, whereby rotation of said crank shaft causes travel of said respective guide members along the lengths of respective guide channels and the raising and lowering of said grill rack.

6. A portable grill as in claim 1 wherein said grill rack comprises a plurality of laterally running elongated V-shaped top grill bars fixed to and equally spaced along the length of spaced apart underlying support bars.

7. A portable grill as set forth in claim 6 having a grease catching means comprising a V-shaped bar closed at both ends running longitudinally under one end of the grill rack and centered under the end of the laterally running top V-shaped grill bars and having a grill rack which tilts slightly downward toward the end at which the grease catcher is located.

8. A portable grill as set forth in claim 1 wherein said positioning means for raising and lowering the grill rack comprises a turn screw located on either side of the portable grill running from the base frame to the apex of the grill support frame and having a turning means for said screw located above the apex of the support frame with the grill rack being connected to the screw by a female threaded guide member and attached to the grill rack at the central longitudinal axis of said grill rack.

9. A portable grill as set forth in claim 8 having a plurality of laterally running elongated V-shaped top grill bars fixed to and equally spaced along the length of the support means.

10. A portable grill as set forth in claim 9 having a grease catching means comprising a V-shaped bar closed at both ends running longitudinally under one end of the grill rack and centered under the end of the laterally running top V-shaped grill bars and having a grill rack which tilts slightly downward toward the end at which the grease catcher is located.

* * * * *